(12) United States Patent
Janssen et al.

(10) Patent No.: US 11,820,873 B2
(45) Date of Patent: Nov. 21, 2023

(54) THERMOPLASTIC COMPOSITE MATERIAL, PROCESS FOR ITS PREPARATION, COMPOSITE STRUCTURES MADE THEREOF AND PROCESS FOR PREPARING COMPOSITE STRUCTURES

(71) Applicant: DSM IP ASSETS B.V., Heerlen (NL)

(72) Inventors: Pim Gerard Anton Janssen, Echt (NL); Marc Rudolf Stefan Huisman, Echt (NL); Giacomo Perfetti, Echt (NL)

(73) Assignee: DSM IP ASSETS B.V., Heerlen (NL)

(*) Notice: Subject to any disclaimer, the term of this patent is extended or adjusted under 35 U.S.C. 154(b) by 331 days.

(21) Appl. No.: 16/954,676

(22) PCT Filed: Dec. 20, 2018

(86) PCT No.: PCT/EP2018/086087
§ 371 (c)(1),
(2) Date: Jun. 17, 2020

(87) PCT Pub. No.: WO2019/122073
PCT Pub. Date: Jun. 27, 2019

(65) Prior Publication Data
US 2020/0307122 A1 Oct. 1, 2020

(30) Foreign Application Priority Data
Dec. 20, 2017 (EP) .................................... 17209050

(51) Int. Cl.
*C08J 5/04* (2006.01)
*B29C 65/16* (2006.01)
(Continued)

(52) U.S. Cl.
CPC ........... *C08J 5/042* (2013.01); *B29C 65/1677* (2013.01); *B29C 66/7212* (2013.01);
(Continued)

(58) Field of Classification Search
CPC ..... B32B 1/08; B29L 2023/22; C09D 177/06; C08G 69/48; B29C 65/1677; B29C 70/00;
(Continued)

(56) References Cited

U.S. PATENT DOCUMENTS 10,377,898 B2    8/2019  Briffaud et al.
2004/0110880 A1* 6/2004  Sugawara ........... B29C 65/1635
                                                         524/155
(Continued)

FOREIGN PATENT DOCUMENTS

CN    104884503      9/2015
JP    2006-241254    9/2006
(Continued)

OTHER PUBLICATIONS

International Search Report for PCT/EP2018/086087 dated Apr. 1, 2019, 6 pages.
(Continued)

*Primary Examiner* — Camie S Thompson
(74) *Attorney, Agent, or Firm* — NIXON & VANDERHYE P.C.

(57) ABSTRACT

The invention relates to a thermoplastic composite material comprising a thermoplastic matrix and a fibrous material impregnated with the thermoplastic matrix, wherein the fibrous material comprises carbon fibers with a weight average aspect ratio of length divided by diameter (L/D) of at least 500; the thermoplastic matrix comprises a thermoplastic polymer and a laser absorbing additive.

17 Claims, 1 Drawing Sheet

Figure 1:
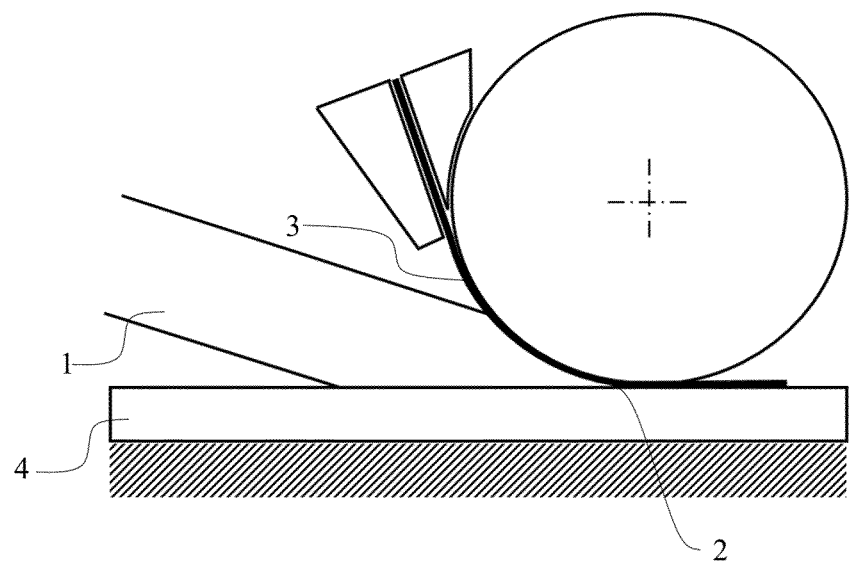

(51) Int. Cl.
  *B29C 65/00* (2006.01)
  *B29C 70/16* (2006.01)
  *B32B 1/08* (2006.01)
  *B29K 77/00* (2006.01)
  *B29K 307/04* (2006.01)
  *B29L 23/00* (2006.01)

(52) U.S. Cl.
  CPC ............... *B29C 70/16* (2013.01); *B32B 1/08* (2013.01); *B29K 2077/00* (2013.01); *B29K 2307/04* (2013.01); *B29L 2023/22* (2013.01); *C08J 2377/00* (2013.01)

(58) Field of Classification Search
  CPC ......... B29C 70/16; B29C 70/48; B29C 70/06; B29C 70/021; B29B 15/12; C08J 2377/00; C08J 2377/12; C08J 5/042; C08J 5/24; C08J 5/04; C08J 2367/00; C08J 2477/06; B29K 2077/00; B29K 2105/08; C08L 77/06; C08L 77/12
  USPC ............... 428/36.9; 427/385.5, 389.9, 393.5; 264/257, 482, 131
  See application file for complete search history.

(56) References Cited

U.S. PATENT DOCUMENTS

| | | |
|---|---|---|
| 2014/0316063 A1 | 10/2014 | Hochstetter et al. |
| 2015/0267050 A1 | 9/2015 | Briffaud et al. |
| 2017/0037185 A1 | 2/2017 | Briffaud et al. |
| 2017/0037204 A1 | 2/2017 | Briffaud et al. |
| 2017/0037208 A1 | 2/2017 | Hochstetter et al. |
| 2017/0165875 A1 | 6/2017 | Gaillard et al. |
| 2017/0335107 A1 | 11/2017 | Briffaud et al. |
| 2019/0381759 A1 | 12/2019 | Isaki et al. |

FOREIGN PATENT DOCUMENTS

| | | |
|---|---|---|
| JP | 2015-501360 | 1/2015 |
| JP | 2015-533908 | 11/2015 |
| JP | 2017-507045 | 3/2017 |
| JP | 2017-511420 | 4/2017 |
| JP | 2017-513739 | 6/2017 |
| JP | 2017-513983 | 6/2017 |
| WO | 2014/040871 | 3/2014 |
| WO | WO 2014/040871 | 3/2014 |
| WO | 2016/073045 | 5/2016 |
| WO | 2017/102381 | 6/2017 |
| WO | 2017/102385 | 6/2017 |
| WO | WO 2017/102381 | 6/2017 |
| WO | WO 2018/135562 | 7/2018 |

OTHER PUBLICATIONS

Written Opinion of the ISA for PCT/EP2018/086087 dated Apr. 1, 2019, 6 pages.
Jial Junke et al; *Research Progress on DFRTP Laser Joining Technology*, China Academic Journal Electronic Publishing House, pp. 24-29 (2016).
JP Application No. P2020-532908, Final Rejection, dated Jun. 6, 2023.

* cited by examiner

THERMOPLASTIC COMPOSITE MATERIAL, PROCESS FOR ITS PREPARATION, COMPOSITE STRUCTURES MADE THEREOF AND PROCESS FOR PREPARING COMPOSITE STRUCTURES

This application is the U.S. national phase of International Application No. PCT/EP2018/086087 filed Dec. 20, 2018 which designated the U.S. and claims priority to EP Patent Application No. 17209050.8 filed Dec. 20, 2017, the entire contents of each of which are hereby incorporated by reference.

The present invention relates to a thermoplastic composite material comprising a thermoplastic matrix and a fibrous material impregnated with the thermoplastic matrix, as well as to a process for its preparation, a process for preparing composite structures employing the thermoplastic composite material, and composite structures made thereof.

Advanced polymer composites have reached a widespread use in the aerospace industry and have undergone significant progress in terms of performance and cost price, which is now leading to their increased use in other industries, most notably in the automotive industry, where weight reduction is of increasing importance. Most widely employed advanced polymer composites are epoxy-based carbon fiber-reinforced polymers (CFRP). However, the field of advanced polymer composites encompasses many more base materials and combination of components used therein. Other than carbon fibers also glass fiber, aramid fibers, and mixtures of different fibers are used, of which glass fibers are economically most attractive. E-glass (general grade, lower cost, more ductile) and S-glass (higher tensile strength) continuous fibers are therefore also widely used. Other than epoxy resins, also other thermoset resin systems, as well as thermoplastic polymers are used. Composites are by nature inhomogeneous; their physical properties change significantly over very small areas. Furthermore, the physical properties of the fiber and the matrix are hugely different, as for example carbon fibers absorb all light wavelengths very efficiently and conduct heat very rapidly, whereas the matrix materials such as epoxy resins and thermoplastic polyamides typically absorb light far less and conduct heat less effectively.

The increased interest of the automotive industry for use of polymer composites has also raised more attention for the possibility of making structural composites by consolidating or adhesive bonding polymer composites by laser welding. Laser welding provides an alternative to conventional joining techniques and offers new perspectives to assemble structural components emerging in industrial manufacturing. However, thermoset polymers such as epoxies are not thermally weldable, so conventional laser-based polymer welding techniques are not feasible, either. This is where thermoplastic materials have made real progress, in consolidating or thermal welding of composites by lasers. Furthermore, carbon fibers are known to absorb all light wavelengths very efficiently, much better than glass fibers, which latter need to be employed in combination with laser light absorbing additives.

Laser transmission welding procedures are known in manufacturing of short fiber thermoplastic composites. In these applications, parts are consolidated by laser welding of two parts on top of each other, with the upper one being transparent for the laser light. Using carbon fibers in the lower component of the joint is well known to provide excellent absorption resulting in good welding behavior.

The use of laser light for bonding of long fiber reinforced thermoplastic composites (LFTPC) also offers new possibilities to overcome the constraints of conventional joining technologies. Herein typically long glass fiber reinforced composites with, for example, polyamide resins are used. In case of automated composite tape placement processes based on carbon fiber reinforced thermoplastic composite materials a different approach needs to be applied: the so-called nip-point heating strategy. Herein both the upper part and the lower part are heated by a bundle of laser light shortly before and close to the position where the two parts are to be joined.

However, as the inventors of the present invention observed, the use of carbon fiber reinforced thermoplastic composite materials in combination with nip-point laser heating leads to insufficient mechanical performance of consolidated parts so produced.

In view of the above, there is a need for thermoplastic composite materials that show a better performance in consolidation by laser welding.

The aim of the present invention is therefore to provide a thermoplastic composite material, as well as a process for its preparation, a process for preparing composite structures employing the thermoplastic composite material, and a composite structure made thereof, wherein the above problems are reduced and mechanical performance of consolidated parts so produced are improved.

This aim has been achieved with the thermoplastic composite material, the processes, and the composite structure according to the invention and defined in the claims.

The thermoplastic composite material according to the invention comprises a thermoplastic matrix and a fibrous material impregnated with the thermoplastic matrix, wherein the fibrous material comprises carbon fibers and the thermoplastic matrix comprises a thermoplastic polymer and a laser absorbing additive.

A fiber is herein understood to be an elongated body having an aspect ratio defined as its length divided by its diameter (L/D) of at least 10. In case the elongated body has a non-circular cross-section, determined by different dimensions in width and thickness, the largest of these two dimensions is taken as the diameter in the aspect ratio. A fibrous material is herein understood to be a material composed of elongated bodies having a number average aspect ratio L/D of at least 10.

This in contrast to fillers and other particulate materials which are defined by a number average aspect ratio L/D of less than 10.

In the composition according to the invention, the carbon fibers have a weight average aspect ratio of length over diameter (L/D) of at least 500.

The effect of the said thermoplastic composite material is that the mechanical properties and bonding strength of a composite structure produced by consolidation of the thermoplastic composite material on a thermoplastic support material by nip-laser welding are significantly improved.

This effect is highly surprising since the laser welding can be done with the carbon fiber reinforcement in the upper part or both upper and lower parts, and the effect is especially noticeable when the carbon fibers are used in a large amount, i.e. in such amounts that the laser light is already fully absorbed by the carbon fibers without the presence of laser absorbing additive. Moreover, carbon black, which can be used as the laser absorbing additive, is known to generally reduce or even deteriorate the mechanical properties of thermoplastic polymer compositions, in particular reinforced thermoplastic polyamide compositions. In contrast to that, the mechanical properties and bonding strength of the composite structure made from thermoplastic composite material according to the invention are improved, also when comprising carbon black. Furthermore, in the thermoplastic composite material according to the present invention, the said positive effect on the mechanical and bonding properties is already achieved when the laser absorbing additive is used in a very small amount.

The fibrous material in the thermoplastic composite material according to the invention is suitably selected from the group consisting of continuous fibers, non-woven structures and textiles (i.e. woven structures), and combinations thereof. The thermoplastic composite material suitably is a sheet or a tape. In a particular embodiment of the invention, the thermoplastic composite material comprises a woven cross-ply structure.

Suitably, the carbon fibers in the composite material according to the invention have a diameter in the range of 5 µm to 20 µm (micrometer), more particular in the range of 8 µm to 15 µm, for example 10 µm, or 12 µm. The carbon fibers also suitably have a weight average fiber length of at least 5 mm, preferably at least 10 mm, more preferably at least 20 mm and even at least 50 mm. The weight average aspect ratio is preferably at least 1000, more preferably at least 2000.

Most preferably, the fibrous material in the composite material according tom the invention comprises continuous carbon fiber, also known as endless carbon fiber. The corresponding thermoplastic composite material comprising continuous carbon fibers is thus characterized as a continuous fiber thermoplastic composite material. The continuous fiber thermoplastic composite material suitably is a sheet or a tape.

In a preferred embodiment of the invention, the thermoplastic composite material is a tape comprising continuous carbon fiber unidirectionally oriented and impregnated with the thermoplastic matrix, the thermoplastic matrix comprising the thermoplastic and the laser absorbing additive.

With "tape" is herein understood an elongated body having a longitudinal direction. Such an elongated body is characterized by different dimensions in different directions, i.e. a length, a width and a thickness, and by a cross-sectional aspect ratio, i.e. the ratio of width over thickness. The longitudinal direction or machine direction of the tape essentially corresponds to the orientation of the endless fibers. The length is the dimension of the tape in longitudinal direction. The width, thickness and cross-section are defined as perpendicular to the longitudinal direction of the tape. By width is herein understood the largest dimension between two points on the perimeter of a cross-section of the tape, said cross-section being orthogonal to the longitudinal direction (i.e. length direction) of the tape. By thickness is herein understood a distance between two points on the perimeter of said cross-section, said distance being perpendicular to the width of the tape. The width and the thickness of a tape can be measured according to known methods in the art, e.g. with the help of a ruler and a microscope or a micrometer, respectively.

Herein the tape may have dimensions of length, thickness and width varying over a wide range. The length dimension of a tape of the invention is not particularly limited. It may be in the range of meters (m), e.g. 10-50 m, or hundreds of meters, e.g. 100-800 m, and even in the range of kilometers (km), for example 2-5 km. The length may exceed 10 km and mainly depends on the endless fibers and the process used to produce the tape. Nevertheless, said tape can for convenience reasons be manufactured to smaller sizes, according to the requirements of the envisioned applications.

The tape according to the invention suitably has a thickness of between 50 µm (micrometer) and may be as thick as 1000 µm (micrometer). If used for applications in which wrapping of a tape is employed, the thickness is preferably between 50 µm (micrometer) and 500 µm (micrometer), more preferably 100 µm (micrometer) and 250 µm (micrometer), as thicker tapes are more difficult to wrap.

Suitable, the tape has a width in the range of 5 mm-50 cm. The width may well be larger, for example 100 cm, or 200 cm or even larger than 200 cm, or smaller than 5 mm, but a width in the range of 5 mm and 10.0 cm is most practical in terms of being sufficiently large for productivity reasons both for the tape as such as for the structural composite made thereof, and sufficiently small for optimally constructing the structural composite and reinforcing parts therein. If a tape has a low width, it needs more wrappings and is therefore energy and time consuming. If the tape has a very large width, bigger areas can be covered in one winding step, but winding on curved surfaces is more difficult and results in inefficiencies. Preferably, the width of the tape is between 1 cm and 8 cm, more preferably between 2 cm and 6 cm.

Suitably, the tape according to the invention has a width in the range of 5 mm-50 cm, or a within a narrower range as mentioned above, in combination with a thickness of between 50 µm and 1000 µm, or a narrower range as mentioned above.

Tapes with a relatively low width, e.g. between 5 mm and 8 cm, is suitably obtained by first producing a tape with a relative large width, e.g. 50 cm-200 cm, and then slitting the tape with the relative large width into several tapes with the relatively low width. For such a process, tape slitting technologies know in the art can be applied.

Carbon Fibers

The amount of carbon fibers in the thermoplastic composite material according to the invention can vary over a wide range and can be tuned to the needs for the structural composite made thereof. Suitably, the carbon fibers are present in an amount of at least 20 wt. % (weight percentage), preferably at least 30 wt. %, more preferably in the range of 40-75 wt. %, relative to the total weight of the thermoplastic composite material.

The density of carbon fibers, which is generally about 1.8-2.3 g/cm$^3$ (gram per cubic centimeter), [for low modulus grades typically about 1.8-2.1 g/cm$^3$ and for high modulus grades about 2.25-2.3 g/cm$^3$], is generally much higher than the density of thermoplastic matrix, and in particular of the thermoplastic polymer, which is generally in the range of about 0.9-1.5 g/cm$^3$, in particular cases, such as for polyesters and polyamides, in the range of about 1.0-1.25, and in special cases, such as for semi-crystalline semi-aromatic polyamides 1.1-1.2 g/cm$^3$. Therefore, the carbon fibers are also suitably present in an amount of at least 15 volume %, preferably at least 20 volume %, more preferably in the range of 30-60 volume %, relative to the total volume of the thermoplastic composite material. It is desirable to have a volume percentage of carbon fiber as high as possible, as this contributes to the strength of the thermoplastic composite material and to the composite structure made thereof.

The carbon fiber used for the preparation of the thermoplastic composite material and the composite structure made thereof may suitably comprise a sizing or a binder or a combination thereof. The sizing may be applied for example, to improve adhesion between the fiber and the thermoplastic matrix. A binder can be used, for example to allow good processing, e.g. by preventing debundling prior to the impregnation step where thermoplastic matrix material is introduced and proper debundling during the impregnation step. Carbon fibers with suitable sizings for different thermoplastic polymers are known to a person skilled in the art. It is usually desirable to have a volume percentage of carbon fiber as high as possible, as this contributes to the strength of the composite structure. For the calculation of the volume %, respectively the wt. % of the carbon fiber, the sizing is considered part of the matrix composition and included in the total volume or total weight of the thermoplastic composite material or layer therein, and not as part of the carbon fiber.

In the thermoplastic composite material, at least 50 wt. %, preferably 75-100 wt. %, more preferably 90-100 wt. % of the fibrous material consists of carbon fibers. In this respect, it is noted that the thermoplastic composite material according to the invention may comprise fibrous material other than carbon fiber, for example, glass fibers, aramid fibers or organic fibers, or mixtures thereof, whereas all components in the thermoplastic composite material, other than the fibrous material are considered part of the matrix composition. However, the amount of other fibrous material, if present at all, is preferably kept limited to, for example, at most 20 wt. %, preferably at most 10 wt. %, relative to the total weight of the thermoplastic composite material, to allow for a high volume of carbon fibers in the thermoplastic composite material. More preferably, the thermoplastic composite material comprises 0-5 wt. % of other fibrous material, even more preferably 0-2.5 wt. % of other fibrous material, relative to the total weight of the thermoplastic composite material.

In a particular embodiment of the invention, the thermoplastic composite material comprises 20-75 wt. % of fibrous material comprising at least 20 wt. % of the carbon fibers and 0-20 wt. % of other fibers. In a preferred embodiment thereof, the thermoplastic composite material comprises 20-75 wt. % of fibrous material comprising at least 20 wt. % of the carbon fibers and 0-10 wt. % of other fibers. In a more preferred embodiment thereof, the thermoplastic composite material comprises 20-75 wt. % of fibrous material consisting of the carbon fibers. Herein, the weight percentages (wt. %) are relative to the total weight of the thermoplastic composite material.

Thermoplastic Polymers

With a thermoplastic polymer is herein understood a polymer that can be melted by heating and resolidified by cooling. This in contrast with thermoset materials which upon heating crosslink and solidify. The effect thereof is that thermoplastic polymers can be processed in the melt multiple times. In the current invention, the thermoplastic polymer can be melt processed for making a composition comprising the thermoplastic polymer and the laser absorbing additive; for making the thermoplastic composite material and for making the composite structure thereof by laser welding.

The thermoplastic polymer in the thermoplastic composite material according to invention can in principle be chosen from any thermoplastic polymer suitable for use in a laser welding process. Examples thereof include polyolefins, PEEK, PPS, polycarbonate, thermoplastic polyesters and thermoplastic polyamides.

In particular, the thermoplastic polymer comprises a thermoplastic polyamide. The thermoplastic polyamide suitable is an aliphatic polyamide or a semi-aromatic polyamide, or a blend thereof, as well as a semi-crystalline polyamide or an amorphous polyamide, or a blend thereof.

With an amorphous polyamide is herein understood a thermoplastic polymer consisting of an amorphous characterized by a glass transition temperature (Tg), and absence of crystalline domains characterized by a melting temperature (Tm).

With a semi-crystalline polyamide is herein understood that the polyamide is a thermoplastic polymer having amorphous domains characterized by a glass transition temperature (Tg), and crystalline domains characterized by a melting temperature (Tm).

With an aliphatic polyamide is herein understood a polyamide consisting of repeat units derived from aliphatic monomers only. Aliphatic monomers are herein understood polyamide forming monomers having one or more carboxylic acid functional groups and/or one or more amine functional groups and an aliphatic back bone. The aliphatic backbone may be linear, branched or cyclic. Examples thereof are PA-6, PA-66, PA-410, PA-6/66.

The polyamides are noted herein as described in Nylon Plastics Handbook, Melvin I. Kohan, Hanser Publishers, 1995, page 5. PA-6 is also known as polycaprolactam, in which the monomeric units are derived from caprolactam. PA-66 is poly(hexamethylene adipamide) in which the monomeric units are derived from hexamethylene diamine and adipic acid. PA-6/PA-66 refers to a blend of PA-6 and PA-66, whereas PA-6/66 refers to a copolyamide. PA-410 is a polyamide in which the monomeric units are derived from 1,4-diaminobutane and sebacic acid. PA-6T/10T is a copolyimide of hexamethylene diamine (C6 diamine) 1,10-decanediamine (C10 diamine) and T is terephthalic acid.

With a semi-aromatic polyamide is herein understood a polyamide consisting of repeat units derived from a combination of aliphatic monomers and aromatic monomers. Aliphatic monomers are herein understood polyamide forming monomers having one or more carboxylic acid functional groups and/or one or more amine functional groups and an aliphatic back bone. The aliphatic backbone may be linear, branched or cyclic. Aromatic monomers are herein understood polyamide forming monomers having one or more carboxylic acid functional groups and/or one or more amine functional groups and an aromatic backbone, i.e. backbone comprising an aromatic structure. Herein the monomers comprising an aromatic backbone may be, for example, an aromatic dicarboxylic acid, or an aromatic diamine, or an arylalkyl diamine, or any combination thereof.

Suitably, the semi-aromatic polyamide consists of repeat units derived from 5-60 mole % of aromatic monomers ((i.e. monomers comprising an aromatic group or backbone) and 40-95 mole % of aliphatic monomers (i.e. monomers comprising an aliphatic backbone), more particular 10-50 mole % of aromatic monomers and 50-90 mole % of aliphatic monomers. Herein the molar percentage (mole %) is relative to the total molar amount of monomers in the polyamide.

In a preferred embodiment, the thermoplastic polymer comprises a semi-aromatic polyamide. This may be any thermoplastic semi-aromatic polyamide and is suitably selected from amorphous semi-aromatic polyamides and semi-crystalline semi-aromatic polyamide, and mixtures thereof.

In one embodiment, the semi-aromatic polyamide comprises an amorphous semi-aromatic polyamide, more particular an amorphous selected from the group consisting of PA-MXDT, PA-MXDI, PA-PXDT, PA-PXDI, and PA-XI/XT, or any mixtures thereof. Herein MXD is meta-xylylene diamine, PXD is paraxylylenediamine, T is terephthalic acid, I is isophthalic acid, X (as in XI and XT) is an aliphatic diamine or a mixture of two or more aliphatic diamines. PA-XI/XT is an amorphous polymer, wherein the molar ratio of I/T is at least 50/50. In particular, PA-XI/XT is PA-6I/6T, i.e. a copolyamide wherein the diamine X is hexamethylenediamine.

In a preferred embodiment, the thermoplastic polyamide comprises at least a semi-crystalline semi-aromatic polyamide. More particular, the semi-crystalline semi-aromatic polyamide in the thermoplastic composite material according to the invention has a glass transition temperature (Tg) of at least 75° C., preferably at least 100° C., more preferably at least 120° C. Herein the glass transition temperature (Tg) measured by the differential scanning calorimetry (DSC) method according to ISO-11357-1/2, 2011, on pre-dried samples in an N2 atmosphere with a heating and cooling rate of 20° C./min. Herein Tg has been calculated from the value at the peak of the first derivative (in respect of temperature) of the parent thermal curve corresponding with the inflection point of the parent thermal curve in the second heating cycle.

Also, preferably, the semi-crystalline semi-aromatic polyamide has a melting temperature (Tm) 220° C., preferably at least 250° C., more preferably at least 280° C., and most preferably 300-340° C. Herein, the melting temperature is measured by the DSC method according to ISO-11357-1/3, 2011, on pre-dried samples in an $N_2$ atmosphere with heating and cooling rate of 20° C./min. Herein Tm has been calculated from the peak value of the highest melting peak in the second heating cycle. Although higher melting semi-crystalline semi-aromatic polyamides are more preferred for use in more demanding applications, such as in parts for automotive under the hood applications, wherein the parts are exposed to higher temperatures and aggressive liquid and gas media, such higher melting semi-crystalline semi-aromatic polyamides are generally also more difficult to weld. Surprisingly, by employing such higher melting semi-crystalline semi-aromatic polyamides in the thermoplastic composite material according to the invention, still very good welding results are obtained.

The semi-crystalline semi-aromatic polyamide suitably has a melting enthalpy (ΔHm) of at least 20 J/g, preferably at least 30 J/g, and more preferably at least 40 J/g. Herein the melting enthalpy (ΔHm) is measured by the DSC method according to ISO-11357-1/3, 2011, on pre-dried samples in an $N_2$ atmosphere with heating and cooling rate of 20° C./min. Herein ΔHm has been calculated from the surface under the melting peak in the second heating cycle.

Examples of suitable, high melting semi-crystalline semi-aromatic polyamides are PA-XT homopolymer, wherein X is a diamine with, for example, 7 to 12 carbon atoms, or a PA-XT/YT copolymer wherein X and Y are different diamines with, for example 4 to 12 carbon atoms, and copolymers thereof with other combinations of ZI and/or ZT monomers, wherein Z is a diamine or a combination of diamines different from X and Y, T is terephthalic acid and I is isophthalic acid.

Laser Absorbing Additive

The thermoplastic composite material according to the invention comprises, next to the fibrous material comprising the carbon fibers and the thermoplastic polymer, a laser absorbing additive. Herein the laser absorbing additive is dispersed in the thermoplastic polymer, and both the thermoplastic polymer and the laser absorbing additive constitute components of the thermoplastic matrix. The laser absorbing additive can be any additive that is able to absorb the laser light in an effective manner and thereby enhance the laser welding. Essentially, as an absorber use can be made of those substances that are capable of absorbing laser light of a certain wavelength. In practice, this wavelength lies between 157 nm and 10.6 μm, the customary wavelength range of lasers. If lasers with larger or smaller wavelengths become available, other absorbers may also be considered for thermoplastic composite material according to the invention. Examples of such lasers working in the said area are CO2 lasers (10.6 μm), Nd:YAG lasers (1064, 532, 355, 266 nm) and excimer lasers of the following wavelengths: F2 (157 nm), ArF (193 nm), KrCl (222 nm), KrF (248 nm), XeCl (308 nm) and XeF (351 nm). Such absorbers are known per se, as is the wavelength range within which they can absorb laser radiation. Examples of suitable laser absorbing additives are carbon black, anthraquinone, azo dyes, and metal compounds such as metal oxides, metal hydroxides, metal sulphides, metal sulphates and metal phosphates. Suitably, the metal herein is one or more of copper, bismuth, tin, aluminum, zinc, silver, titanium, antimony, manganese, iron, nickel and chromium.

Preferably, the laser absorbing additive comprises:
carbon black, or
one or more metal compounds selected from the group consisting of metal oxides, metal hydroxides, metal sulphides, metal sulphates and metal phosphates, wherein the metal is one or more of copper, bismuth, tin, aluminium, zinc, silver, titanium, antimony, manganese, iron, nickel and chromium,
or both carbon black and one or more of the metal compounds.

More preferably, the metal compound selected from the said group is chosen from antimony trioxide, tin dioxide, barium titanate, titanium dioxide, aluminum oxide, copper-hydroxy-phosphate, copper-ortho-phosphate, copper-hydroxide, antimony-tin oxide, or any mixtures thereof.

Most preferably, the laser absorbing additives comprises at least carbon black or even consists of carbon black.

Suitably, the carbon black has a number average primary particle size in the range of 10 nm-500 nm, preferably in the range of 10 nm-100 nm. Herein the particle size is measured directly by electron microscopy coupled with image analysis, using the method of ASTM D-3849. The carbon black may comprise larger aggregates composed of multiple primary particles. The carbon black suitably has a number average aggregate size in the range of 40 nm-600 nm. Examples of suitable carbon blacks are Black Pearls 280 and Black Pearls 88 from Cabot.

As the laser absorbing additive already has an effect at a very low content level, it can be present in an amount varying over a wide range. Suitably, the laser absorbing additive is present in an amount in the range of 0.01-3 wt. %, preferably 0.02-2 wt. %, more preferably 0.05-0.5 wt. %, relative to the total weight of the thermoplastic composite material.

In a particularly preferred embodiment, the thermoplastic composite material comprises, or even consists of carbon black in an amount in the range of 0.01-2 wt. %, preferably 0.01-1 wt. %, more preferably 0.02-0.5 wt. %, relative to the total weight of the thermoplastic composite material.

Suitably, the thermoplastic composite material is prepared from a thermoplastic material, such that the laser absorbing additive is present in an amount of 0.02-5 wt. %, more particular 0.05-3 wt. %, relative to the total weight of the thermoplastic material, respectively relative to the total weight of the thermoplastic matrix.

Other Components

The thermoplastic matrix may comprise, next to the thermoplastic polymer and the laser absorbing additive one or more other components, in such amounts not preventing the laser welding of the thermoplastic composite material. The thermoplastic matrix optionally comprises any of the following ingredients such as heat stabilizer, flame retardant, lubricant, mold release agent, processing aid, stabilizer, impact modifier, nucleating agent, antistatic agent, pigments and dyes, as well as sizings or binders, or any combination thereof. These ingredients are known to a person skilled in the art and are usually present in minor amounts such as for example between 0.001 wt % and 10 wt % with respect to the total weight of the thermoplastic matrix.

The thermoplastic matrix preferably consists of
85-99.98 wt. % of the thermoplastic polymer;
0.02-5 wt. % of the laser absorbing additive; and
0-12 wt. % of one or more other components.
More preferably, the thermoplastic matrix consists of
90-99.95 wt. % of the thermoplastic polymer;
0.05-3 wt. % of the laser absorbing additive; and
0-7 wt. % of one or more other components.
Herein the weight percentages (wt. %) are relative to the total weight of the thermoplastic matrix, and the sum is 100%.

In a particular embodiment hereof, 75-100 wt. % of the thermoplastic polymer consists of a semi-crystalline semi-aromatic polyamide.

In a particular embodiment of the invention the thermoplastic composite material consists of
20-75 wt. % of fibrous material, comprising at least 20 wt. % of carbon fibers having a weight average aspect ratio of length divided by diameter (L/D) of at least 500 and 0-20 wt. % of other fibers; and
25-80 wt. % of thermoplastic matrix, comprising the thermoplastic polymer, 0.01-3 wt. % of the laser absorbing additive and 0-5 wt. % of one or more other components;
wherein the weight percentages (wt. %) are relative to the total weight of the composition.

Process for Preparation

The invention also relates to a process for the preparation of a thermoplastic composite material comprising a thermoplastic matrix and a fibrous material impregnated with the thermoplastic matrix, as well as to a process for preparing composite structures employing the thermoplastic composite material and to composite structures made thereof.

The thermoplastic composite material according to the invention may be prepared by any conventional method suitable for making thermoplastic composite materials. Such process typically comprises the steps of
providing fibrous material comprising at least carbon fibers;
providing a melt of a thermoplastic composition comprising a thermoplastic polymer and a laser absorbing additive dispersed in the thermoplastic polymer;
impregnating the fibrous material with the melt, thereby obtaining an impregnated material; and
cooling the impregnated material and solidifying the melt.

The process can be used for the preparation of the thermoplastic composite material, or any of the special or preferred embodiments thereof as described above. The thermoplastic composite material produced with this process suitably is in the form of sheets or a tape. To produce the sheets and tape, conventional impregnation processes and equipment used for impregnating fibrous materials with a thermoplastic material and known to the skilled person can be used.

One embodiment thereof relates to process for the preparation of a thermoplastic composite material. Said process comprises steps of: (i) providing carbon fibers and optionally one or more other fibrous materials; (ii) providing a thermoplastic material comprising a thermoplastic polymer and a laser absorbing additive dispersed in the thermoplastic polymer; and (iii) impregnating the fibers and if present the other fibrous material or other fibrous materials with the thermoplastic material.

A special embodiment relates to the process for the preparation of a continuous fiber thermoplastic composite material or reinforced tape, comprising the steps of:
(i) providing unidirectional continuous fibers at least comprising carbon fibers;
(ii) providing a thermoplastic composition comprising a thermoplastic polymer and a laser absorbing additive dispersed in the thermoplastic polyamide;
(iii) impregnating the fibers with the thermoplastic material, thereby forming a continuous fiber thermoplastic composite material comprising the unidirectional continuous fibers embedded in a thermoplastic matrix comprising the thermoplastic polyamide and the laser absorbing additive.

The advantage of this process is that it can carried out as a continuous or semi-continuous process. For such a process, conventional (semi)-continuous impregnation processes and equipment used for impregnating of continuous fibers with a thermoplastic material and known to the skilled person can be used.

For the fibers, the carbon fibers, and optionally other fibrous materials can be used, suitably in the relative amounts and special and preferred embodiments thereof as mentioned above. Also for the constituents of the thermoplastic material, the polyamide, the laser absorbing additive and optionally further components as mentioned above can be used, suitably in the relative amounts and special and preferred embodiments thereof as mentioned above for the constituents of the thermoplastic matrix.

For the impregnation step, the thermoplastic composition is suitably applied as a melt onto the fibers. Suitably, the temperature of the melt (Tx) is herein at least 5° C., preferably at least 10° C. above Tg or Tm of the thermoplastic polymer, and even more preferably in the range of 20-50° C. above Tg or Tm. Herein Tx is determined relative to the glass transition temperature (Tg) of the thermoplastic polymer, in case the thermoplastic polymer is an amorphous polymer. In case the thermoplastic polymer is a semi-crystalline polymer, Tx is determined relative to is the melting temperature (Tm) of the polyamide. A higher melt temperature Tx above the lower limit, has the advantage of a better or faster impregnation of the fiber, whereas a temperature Tx below the upper limit has the advantage that the exposure of the polyamide to elevated temperature is limited thereby reducing the risk of degradation of the polyamide during the process. The latter is particularly advantageous for use of higher melting semi-crystalline semi-aromatic polyamide in the thermoplastic composite material.

Another process according the invention is related to the preparation of a composite structure. This process comprises an assembly step comprising consolidating of at least a first piece of a thermoplastic composite material onto a second piece of a second material. Herein the thermoplastic composite material in the first piece is a thermoplastic composite material according to the present invention, or any special or preferred embodiment thereof as defined above. The second material may as well be a thermoplastic composite material according to the present invention. Herein, the thermoplastic composite material in the first piece and the second piece may be identical or may be different variants of the thermoplastic composite material according to the present invention. The second material may also be a second thermoplastic material, not being a thermoplastic composite material according to the present invention.

The consolidation in the said process for preparing the composite structure may be any process wherein the first piece of thermoplastic composite material and the second are integrated in the composite structure. Suitably, the consolidation is done by at least partially heating or welding. Preferably, the consolidation is done by laser welding of the first piece onto the second piece.

In a preferred embodiment of the process, the first piece is a piece of a tape according to the invention, or a special or preferred embodiment thereof as defined above. The piece of tape is applied on the second piece, and optionally wrapped or wound around the second piece. Optionally this is also combined with a consolidation step by laser welding, more particular by nip-laser welding. The advantage is that the consolidation step is more effective and results in a composite structure with improved mechanical properties In a specially preferred embodiment, the process comprises steps of
- winding a tape as mentioned above, such that successive windings partially overlap with each other at overlapping areas;
- consolidating the overlapping areas of the tape, thereby creating a hollow body;
- cooling the hollow body to become solid.

More particularly, the consolidation step in this embodiment is done by nip-laser welding.

Suitably, in this process the tape is wound around a support, and the support is removed in a last step. The support may be, for example, a mandrel.

The invention also relates to a composite structure, obtainable by a process as described above. The composite structure comprises at least a piece of a thermoplastic composite material of the present invention describe above, consolidated onto a second piece of a second material. Suitably, the composite structure is a hollow body, for example a vessel, or a pipe, or a 3-dimensional part. The 3-dimensional part suitably comprises a core part, made of a plastic material, and local reinforcement elements consolidated on the core part, the local reinforcement elements being made of the thermoplastic composite material of the present invention or any special or preferred embodiment describe above.

FIGURES

FIG. 1 is a schematic illustration of a tape placement process, wherein a tape is placed onto and consolidated on a substrate by use of a laser beam. As illustrated in FIG. 1, in this process the laser beam (1) is focused at or close to the nip-point (2), thus heating both a portion of one side of the tape (3) and a portion of the upper side of the substrate (4), shortly before contacting each other. Such a process can be used for local reinforcement of a part.

Figure 2:
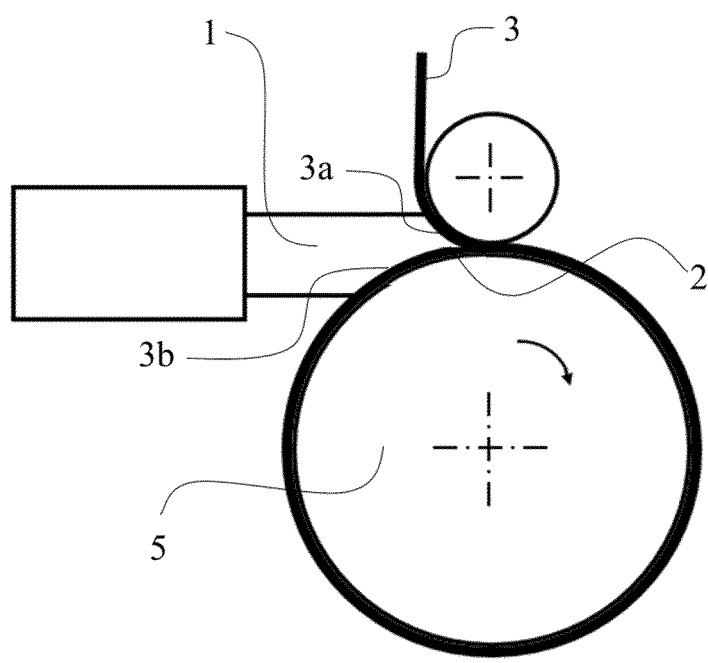

FIG. 2 is a schematic illustration of a tape winding process. Herein the tape (3) is wound a cylinder (5) and consolidated by use of a laser beam (1), wherein the laser beam is focused at or close to the nip-point (2), thus heating simultaneously a portion of one side of the tape (3a) and another portion of the other side of the tape (3b), shortly before contacting each other. Such a process can be used for producing tubes or containers.

The invention is further illustrated with the following examples and comparative experiments.

Materials

| | |
|---|---|
| sc-PPA-I | PA 6T/4T (60 mole %/40 mole %), VN of 80, Tg 151° C. and Tm 338° C., (ex DSM) |
| sc-PPA-II | PA 6T/4T (60 mole %/40 mole %), VN of 100, Tg 151° C. and Tm 338° C., (ex DSM) |
| am-PPA | Novamid X21 F07 PA 6I/6T (70 mole %/30 mole %) semi aromatic amorphous copolyamide, Tg 127° C., (ex DSM). |
| CB-MB | Carbon black masterbatch based on sc-PPA containing 20 wt. % Black Pearls 880 and 80 wt. % sc-PPA. |
| CF | Continuous carbon fibers |

Preparation Thermoplastic Polymer Compositions of Examples I and II and Comparative Experiments A and B Polyamides compositions were prepared by melt mixing the polymers sc-PPA-I or sc-PPA-II with am-PPA in the desired ratio, and optionally the masterbatch CB-MB, on a Berstorff ZE25/48 UTX (a co-rotating twin-screw extruder) operating at 350 rpm and using a wall temperature setting of 360° C. All polymeric materials and additives were fed to the feed-throat of the extruder. The settings used resulted in a temperature of the melt exiting the die-head of approximately 370-380° C. The mean residence time of the molten polymers in the extruder was about 120 seconds. The compositions have been listed in table 1.

Test Methods

Viscosity Number (VN)

The VN was measured in 96% sulphuric acid with a polymer concentration of 0.005 g/ml at 25° C. by the method according to ISO 307, fourth edition.

Determination of Melting Temperature by DSC According to ISO-11357-1/3, (2011).

The measurements of the melting temperature (Tm) were carried out with a Mettler Toledo Star System (DSC) using a heating and cooling rate of 20° C./min in an N2 atmosphere. For the measurements, a sample of about 5 mg pre-dried powdered polymer was used. The pre-drying was carried out at high vacuum, i.e. less than 50 mbar and at 105° C. during 16 hrs. The sample was heated from 0° C. to 360° C. with a heating rate of 20° C./min, immediately cooled to 0° C. with a cooling rate of 20° C./min and subsequently heated again at 20° C./min to 360° C. For the melting temperature Tm, the peak value of the melting peak in the second heating cycle was determined. For the melting enthalpy ΔHm the melting enthalpy of the melting peak in the second heating cycle was determined.

Glass Transition Temperature by DSC (According to ISO-11357-2 (2013)

The measurements of the glass transition temperature (Tg) were carried out with a Mettler Toledo Star System (DSC) using a heating and cooling rate of 20° C./min in an N2 atmosphere in the same way as described above for the Tm. Herein the Tg was determined as the temperature at the peak of the first derivative (with respect of time) of the parent thermal curve corresponding with the inflection point of the parent thermal curve for the second heating cycle.

Tape and Tube Production

Tapes were produced from the polymer compositions with (Examples I and II) and without carbon black (Comparative Experiments A and B) and carbon fibers. Then tubes were produced by winding the tapes around a cylinder and laser nip-welding of the wound tape. Adhesion and shear strength of the tape construct was measured after the winding and welding step. Results are shown in Table 1.

TABLE 1

Compositions, tape and tube production and test results

| Thermoplastic composition | CE-A | CE-B | EX-I | EX-II |
|---|---|---|---|---|
| Color | NC | NC | BK | BK |
| sc-PPA-I (wt %) | 65 | | 64 | |
| sc-PPA-II (wt %) | | 65 | | 64 |
| am-PPA (wt %) | 35 | 35 | 35 | 35 |
| CB MB (wt %) | 0 | 0 | 1 | 1 |
| Tm | 310 | 310 | 309 | 311 |
| Tg | 138 | 138 | 137 | 138 |
| ΔHm | 60 | 57 | 58 | 56 |
| Viscosity Number PPA | 80 | 100 | 80 | 100 |
| Tape production | Good | OK | Good | OK |
| CF content (wt %) | 50 | 50 | 50 | 50 |
| Carbon black content in tape (wt %) | 0 | 0 | 0.1 | 0.1 |
| 90° tensile strength | Good | OK | Good | OK |
| Slitting | Good | OK | Good | OK |
| Winding and nip-welding | Marginally OK | White foam | Good | Good |
| Quality tube (process feedback) | Bad | Ugly | Good | Good |
| Peel strength | Low | — | High | High |
| ILSS | Low | — | High | High |

The invention claimed is:

1. A thermoplastic composite material comprising:
   (i) a thermoplastic matrix, and
   (ii) a fibrous material impregnated with the thermoplastic matrix, wherein
   the fibrous material comprises at least 20 wt. %, relative to the total weight of the thermoplastic composite material, of carbon fibers with a weight average aspect ratio of length divided by diameter (L/D) of at least 500; and wherein
   the thermoplastic matrix comprises a thermoplastic polymer and 0.01-2 wt. %, relative to the total weight of the thermoplastic composite material, of a laser absorbing additive, and wherein
   the thermoplastic composite material is a tape comprising at least a layer comprising unidirectionally oriented continuous carbon fibers.

2. The thermoplastic composite material according to claim 1, wherein the composite material is a tape having a thickness in the range of 50 μm-1000 μm, and/or having a width in the range of 5 mm-50 cm.

3. The thermoplastic composite material according to claim 1, wherein the thermoplastic polymer comprises a thermoplastic polyamide.

4. The thermoplastic composite material according to claim 1, wherein the laser absorbing additive comprises carbon black.

5. The thermoplastic composite material according to claim 1, wherein the thermoplastic polymer comprises a semi-crystalline semi-aromatic polyamide.

6. A process for the preparation of the thermoplastic composite material according to claim 1, comprising steps of:
   (i) providing the fibrous material comprising the carbon fibers;
   (ii) providing a melt of a thermoplastic composition comprising the thermoplastic polymer and the laser absorbing additive;
   (iii) impregnating the fibrous material with the melt thereby obtaining an impregnated material; and
   (iv) cooling the impregnated material and solidifying the melt to thereby form the thermoplastic composite material.

7. A process for preparing a thermoplastic composite structure, comprising an assembly step which comprises consolidating at least a first piece of the thermoplastic composite material according to claim 1 onto a second piece of a second material.

8. The process according to claim 7, wherein the second material is a thermoplastic composite material, identical to or different from the thermoplastic composite material in the first piece.

9. The process according to claim 7, wherein the step of consolidating the first and second pieces is done by at least partially heating or welding.

10. The process according to claim 7, wherein the step of consolidating the first and second pieces is done by laser welding.

11. The process according to claim 7, wherein the step of consolidating the first and second pieces is done by nip-laser welding.

12. The process according to claim 7, wherein the first piece is a piece of a tape, optionally wrapped or wound around the second piece.

13. The process according to claim 12, further comprising the steps of:
   (a) winding the tape such that successive windings of the tape partially overlap with each other at overlapping areas;
   (b) consolidating the overlapping areas of the tape thereby creating a hollow body; and
   (c) cooling the hollow body to become solid.

14. A composite structure comprising a first piece comprising the thermoplastic composite material according to claim 1 consolidated onto a second piece of a second material.

15. The composite structure according to claim 14, wherein the first and second pieces have been consolidated by laser welding.

16. The composite structure according to claim 14, wherein the composite structure is a hollow body, a hollow pipe or a 3-dimensional part comprising a core part made of a plastic material and local reinforcement elements made of a thermoplastic composite material consolidated on the core part.

17. A process for the preparation of a composite tape material, comprising the steps of:
   (i) providing unidirectional continuous fibers, and
   (ii) impregnating the fibers with a thermoplastic material, wherein
   the unidirectional continuous fibers comprise carbon fibers and the thermoplastic material comprises a semi-aromatic polyamide and a laser absorbing additive dispersed in the semi-aromatic polyamide.

* * * * *